US 9,680,186 B2

(12) United States Patent
Tsukui

(10) Patent No.: US 9,680,186 B2
(45) Date of Patent: Jun. 13, 2017

(54) METHOD FOR MANUFACTURING SEALED BATTERY

(71) Applicant: TOYOTA JIDOSHA KABUSHIKI KAISHA, Toyota-shi, Aichi (JP)

(72) Inventor: Akira Tsukui, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 191 days.

(21) Appl. No.: 14/418,537

(22) PCT Filed: Aug. 5, 2013

(86) PCT No.: PCT/JP2013/071165
§ 371 (c)(1),
(2) Date: Jan. 30, 2015

(87) PCT Pub. No.: WO2014/024848
PCT Pub. Date: Feb. 13, 2014

(65) Prior Publication Data
US 2015/0155603 A1 Jun. 4, 2015

(30) Foreign Application Priority Data

Aug. 7, 2012 (JP) .................................. 2012-175185

(51) Int. Cl.
H01M 10/42 (2006.01)
H01M 2/36 (2006.01)
H01M 10/0525 (2010.01)
H01M 10/30 (2006.01)

(52) U.S. Cl.
CPC ....... *H01M 10/4228* (2013.01); *H01M 2/361* (2013.01); *H01M 2/362* (2013.01); *H01M 10/0525* (2013.01); *H01M 10/30* (2013.01)

(58) Field of Classification Search
CPC ..... H01M 2/36; H01M 10/04; H01M 10/4228
See application file for complete search history.

(56) References Cited

U.S. PATENT DOCUMENTS 6,593,026 B1 7/2003 Tukawaki et al.
6,706,440 B1 3/2004 Takimoto et al.

FOREIGN PATENT DOCUMENTS

| CN | 1350336 A | 5/2002 |
| CN | 1350337 A | 5/2002 |
| JP | 2001-196050 A | 7/2001 |
| JP | 2002-117901 A | 4/2002 |
| WO | 2014010024 A1 | 1/2014 |

OTHER PUBLICATIONS

International Search Report for PCT/JP2013/071165 dated Sep. 17, 2013.

*Primary Examiner* — Hezron E Williams
*Assistant Examiner* — David Z Huang
(74) *Attorney, Agent, or Firm* — Sughrue Mion, PLLC

(57) ABSTRACT

Provided is a method for manufacturing a sealed battery, capable of reducing an erroneous determination rate in a leak testing step. A manufacturing step including a leak testing step for detecting leak of helium gas introduced into an exterior, including a step for pouring an electrolytic solution into the exterior, a step for reducing the pressure inside the exterior down to a predetermined pressure, and a step for introducing the helium gas in a quantity corresponding to the predetermined pressure into the exterior. Preferably, the predetermined pressure is set to a pressure higher than the saturated steam pressure of the electrolyte solution.

2 Claims, 7 Drawing Sheets

METHOD FOR MANUFACTURING SEALED BATTERY

CROSS REFERENCE TO RELATED APPLICATIONS

This application is a National Stage of International Application No. PCT/JP2013/071165 filed Aug. 5, 2013, claiming priority based on Japanese Patent Application No. 2012-175185 filed Aug. 7, 2012, the contents of all of which are incorporated herein by reference in their entirety.

TECHNICAL FIELD

The present invention relates to a method for manufacturing a sealed battery, including a leak testing step for detecting leak of detection gas introduced into a battery case.

BACKGROUND ART

Conventionally, a step for manufacturing a sealed battery includes a leak testing step for checking the airtightness of a battery case for the purpose of, for example, prevention of degradation of battery performance caused by ingress of moisture into the battery case (see Patent Literature 1, for example).

Patent Literature 1 discloses a technique as follows:

First, a battery can (i.e., a battery case) is sealed except for a pouring hole, and then, air in the battery can is exhausted through the pouring hole by exhausting means (i.e., the pressure inside the battery can is reduced).

Next, the battery can is connected to an electrolytic solution pot, and then, a difference in pressure between the battery can and the electrolytic solution pot causes an electrolytic solution to be poured into the battery can through the pouring hole. At this time, the inside of the electrolytic solution pot is pressurized with helium gas so that the helium gas is introduced into the battery can through the pouring hole.

Finally, a leak testing step is performed in which the pouring hole is sealed, and then, the quantity of helium gas present in leak gas leaked from the battery can is checked with a helium leakage detector.

If helium gas is introduced when an electrolytic solution is poured similarly to the technique disclosed in Patent Literature 1, the electrolytic solution penetrates an electrode body before a leak testing step is performed, and then, gas present in the electrode body is exhausted to the outside of the electrode body. Accordingly, a density of helium gas inside a battery can is decreased.

The penetrance of the electrolytic solution with respect to the electrode body at this time, namely, a quantity of the exhausted gas varies depending on various periods of time from the introduction of helium gas to the leak testing step.

In other words, in the technique disclosed in Patent Literature 1, the variations in penetrance of the electrolytic solution with respect to the electrode body cause a variation in density of helium gas present in the leak gas (i.e., density of helium gas inside the battery can in the leak testing step).

As shown in FIG. 7, an output value of a helium leakage detector when a predetermined quantity of leak gas leaks from a battery can depends on the density of helium gas present in the leak gas. Specifically, an output value of a helium leakage detector when a predetermined quantity of leak gas leaks from a battery can becomes large in the case where the density of helium gas present in the leak gas is high (see a graph G11 in FIG. 7), whereas an output value of a helium leakage detector when a predetermined quantity of leak gas leaks from a battery can becomes small in the case where the density of helium gas present in the leak gas is low (see a graph G12 in FIG. 7).

In a leak testing step, an inspection threshold T1 needs to be set on the basis of a leakage of the leak gas in the case of the low density of helium gas present in the leak gas.

Consequently, there is a possibility that an output value of a helium leakage detector exceeds the inspection threshold T1 in the case where the density of helium gas present in the leak gas is high, in spite of the leakage of the leak gas that is smaller than a leakage L of the leak gas corresponding to the inspection threshold T1 in the case of the low density of helium gas present in the leak gas (see a range R1 in FIG. 7).

In the case where the density of helium gas present in the leak gas varies similarly to the technique disclosed in Patent Literature 1, the inspection threshold T1 needs to be made small by the variation, and therefore, normal products may be erroneously determined as defective products with a relatively high probability.

As mentioned above, there is a possibility that an erroneous determination rate is increased in the leak testing step in the technique disclosed in Patent Literature 1.

CITATION LIST

Patent Literature

Patent Literature 1: JP 2002-117901 A

SUMMARY OF INVENTION

Problem to be Solved by the Invention

The present invention has been accomplished in view of the situation as mentioned above. The object of the present invention is to provide a method for manufacturing a sealed battery, capable of reducing an erroneous determination rate in a leak testing step.

Means for Solving the Problem

A first aspect of the invention is a method for manufacturing a sealed battery, including a leak testing step for detecting leak of detection gas introduced into a battery case, the method including a step for pouring an electrolytic solution into the battery case, a step for reducing an internal pressure of the battery case into which the electrolytic solution is poured down to a predetermined pressure, and a step for introducing the detection gas in a quantity corresponding to the predetermined pressure into the battery case whose internal pressure is reduced down to the predetermined pressure.

Preferably, the predetermined pressure is higher than a saturated steam pressure of the electrolytic solution.

Effects of the Invention

The present invention makes it possible to reduce an erroneous determination rate in a leak testing step.

DESCRIPTION OF EMBODIMENTS

Described below is a manufacturing step S1 as an embodiment of a method for manufacturing a sealed battery according to the present invention.

Figure 1:
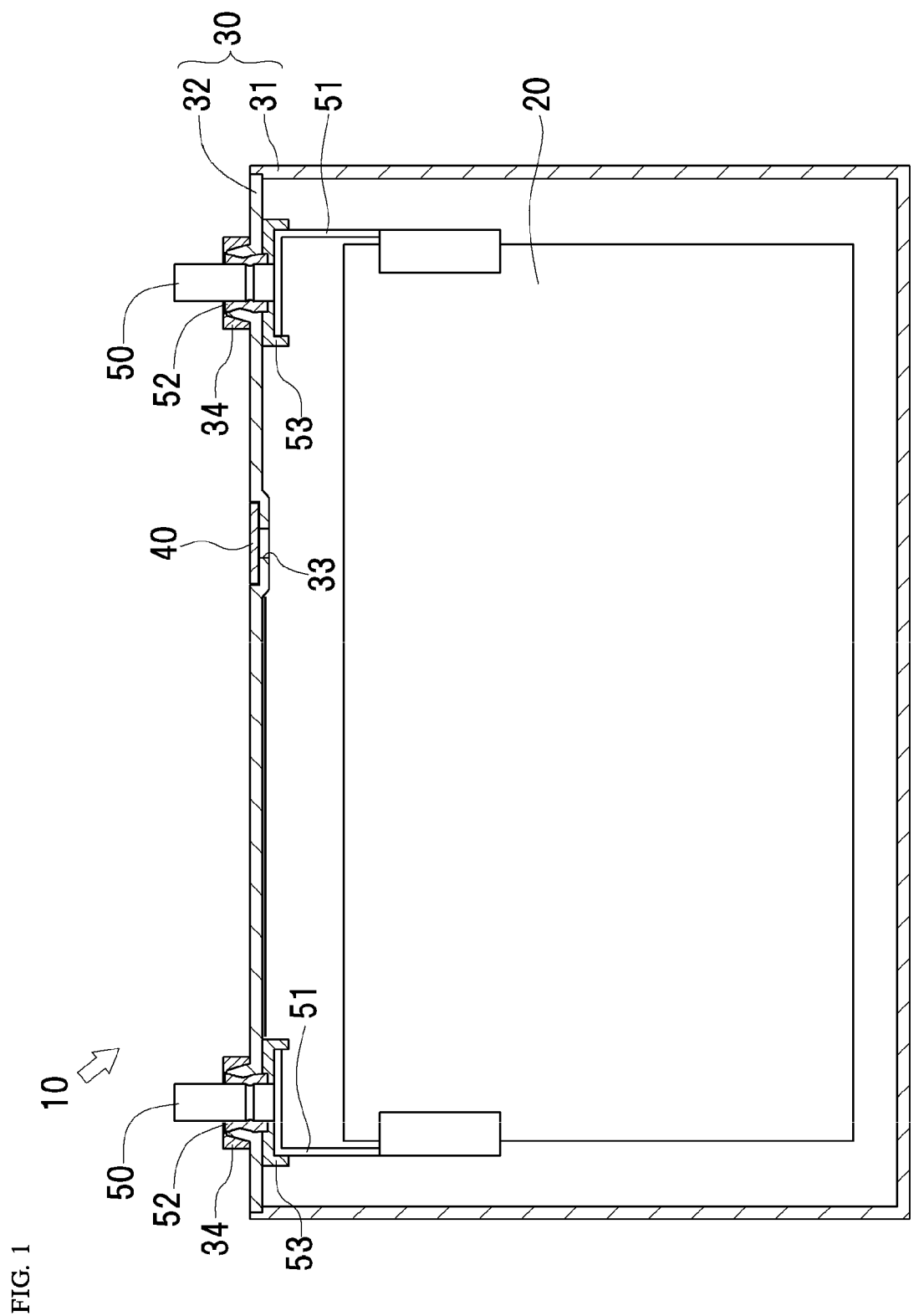
FIG. 1 is a view showing the general configuration of a battery.

With reference to FIG. 1, a battery 10 as an embodiment of a sealed battery according to the present invention is described.

The battery 10 is a sealed lithium-ion secondary battery. Incidentally, batteries to which the present invention is applied are not limited to a lithium-ion secondary battery. The present invention is applicable to other sealed batteries such as a nickel metal hydride secondary battery.

The step for manufacturing the battery 10 includes a leak testing step for detecting the leakage of detection gas introduced into a battery case so as to check the sealability of the battery case.

The battery 10 is provided with a power generating element 20, an exterior 30, a cap 40, and outside terminals 50 and 50.

The power generating element 20 is constituted such that an electrolytic solution penetrates an electrode body B obtained by laminating and winding a positive electrode, a negative electrode, and a separator. A chemical reaction occurs inside the power generating element 20 during electric charging/discharging of the battery 10 (specifically, ions move between the positive electrode and the negative electrode via the electrolytic solution), thereby causing a current.

The exterior 30 serving as a battery case is a can in the shape of substantially a rectangular parallelepiped, and has a storage part 31 and a lid part 32.

The storage part 31 is a bottomed square cylindrical member opened at one surface thereof, and contains the power generating element 20 therein.

The lid part 32 is a planar member formed into a shape in conformity with the open surface of the storage part 31, and is joined to the storage part 31 in such a manner as to close the open surface of the storage part 31. At the lid part 32 is formed a pouring hole 33, through which an electrolytic solution is poured, between portions at which the outside terminals 50 and 50 are inserted.

The pouring hole 33 is formed into a substantially circular shape, as viewed on a plane, which has different inner diameters at the outside and the inside of the lid part 32. That is to say, in the pouring hole 33, an upper inner diameter (i.e., an upper portion in FIG. 1) is greater than a lower inner diameter (i.e., a lower portion in FIG. 1).

Here, although the battery is the square battery having the exterior formed into the bottomed square cylindrical shape in the present embodiment, the battery is not limited to this type. For example, a battery may be a cylindrical battery having an exterior formed into a bottomed cylindrical shape.

The cap 40 is adapted to seal the pouring hole 33. The cap 40 is formed into substantially the same shape as the upper portion of the pouring hole 33. The cap 40 is fitted to the upper portion of the pouring hole 33 in such a manner as to close the lower portion of the pouring hole 33. The outer peripheral edge of the cap 40 is welded by a laser, and therefore, the cap 40 is joined to the lid part 32.

The outside terminals 50 and 50 are disposed such that a part thereof projects from the outside surface of the lid part 32 upward (i.e., outward) of the battery 10. The outside terminals 50 and 50 are electrically connected to the positive electrode and the negative electrode of the power generating element 20 via current collecting terminals 51 and 51, respectively. A fixing member 34 is fitted at the outer peripheral surface of each of the outside terminals 50 and 50, and thus, the outside terminals 50 and 50 are fixed to the lid part 32 via insulating members 52 and 53 in an insulating manner. The outside terminals 50 and 50 and the current collecting terminals 51 and 51 function as energization paths for taking out electric power stored in the power generating element 20 or taking in electric power from the outside to the power generating element 20.

The current collecting terminals 51 and 51 are connected to the positive electrode and the negative electrode of the power generating element 20, respectively. The materials of the current collecting terminals 51 and 51 are, for example, aluminum on a positive electrode side and copper on a negative electrode side.

In the outside terminals 50 and 50, a portion projecting outward of the battery 10 is subjected to roll threading, thus forming a bolt. During actual use of the battery 10, a bus bar and a member such as a connecting terminal for an outside device are securely fastened to the outside terminals 50 and 50 by the use of the bolt.

In securely fastening these members, a fastening torque is applied to the outside terminals 50 and 50, and further, screw tightening applies external force in an axial direction. Consequently, it is preferable that a highly strong material such as iron should be used as a material of the outside terminals 50 and 50.

The manufacturing step S1 is described below.

In the manufacturing step S1, the surface of a current collector (i.e., a positive electrode current collector and a negative electrode current collector) is coated with a mixture (i.e., a positive electrode mixture and a negative electrode mixture) by using a coating machine such as a die coater, and then, the mixture is dried.

Thereafter, the mixture applied onto the surface of the current collector is pressed, thereby forming a mixture layer (i.e., a positive electrode mixture layer and a negative electrode mixture layer) at the surface of the current collector.

Hence, a positive electrode and a negative electrode are fabricated.

In the manufacturing step S1, the positive electrode and the negative electrode fabricated through the above-mentioned process and a separator are laminated, followed by winding, thus fabricating the electrode body B. After that, the outside terminals 50 and 50 and the current collecting terminals 51 and 51 integrated with the lid part 32 of the exterior 30 are connected to the electrode body B, which is then stored in the storage part 31 of the exterior 30. Thereafter, the storage part 31 and the lid part 32 of the exterior 30 are joined by welding, followed by sealing.

Figure 2:
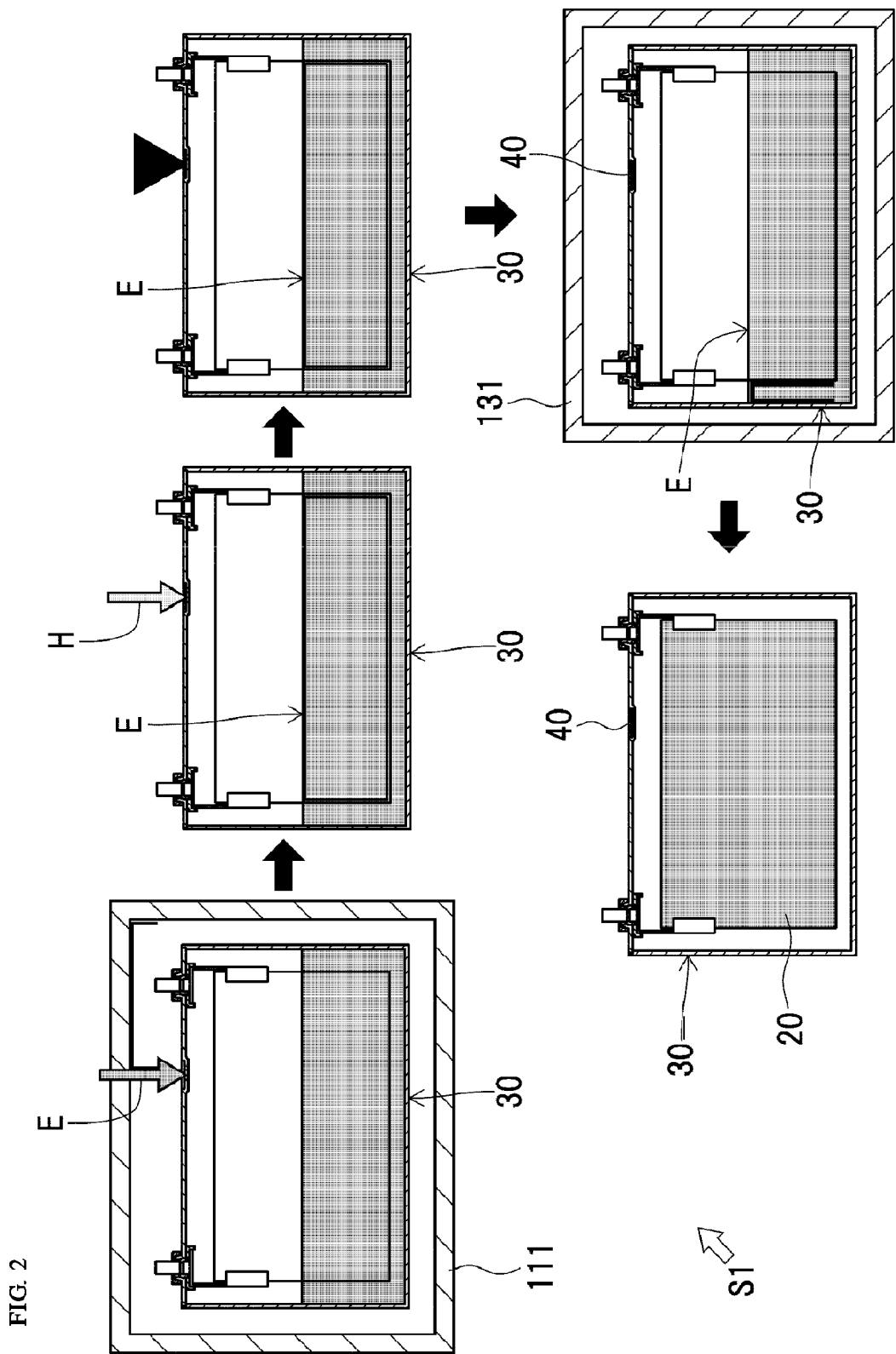
FIG. 2 shows a step for manufacturing the battery.

After the exterior 30 is sealed, an electrolytic solution E is poured through the pouring hole 33, as shown in FIG. 2 (see an arrow E in FIG. 2).

At this time, for example, the exterior 30 is stored inside a chamber 111, and further, a predetermined liquid pouring unit is set at the exterior 30 so that the chamber 111 is evacuated. Thereafter, the atmosphere is introduced into the chamber 111, and thus, the inside of the chamber 111 is returned to the atmospheric pressure. In the manufacturing step S1, the electrolytic solution E is poured into the exterior 30 by utilizing the difference in pressure produced at this time.

After the electrolytic solution E is poured into the exterior 30, helium gas H is introduced into the exterior 30 (see an arrow H in FIG. 2).

Figure 3:
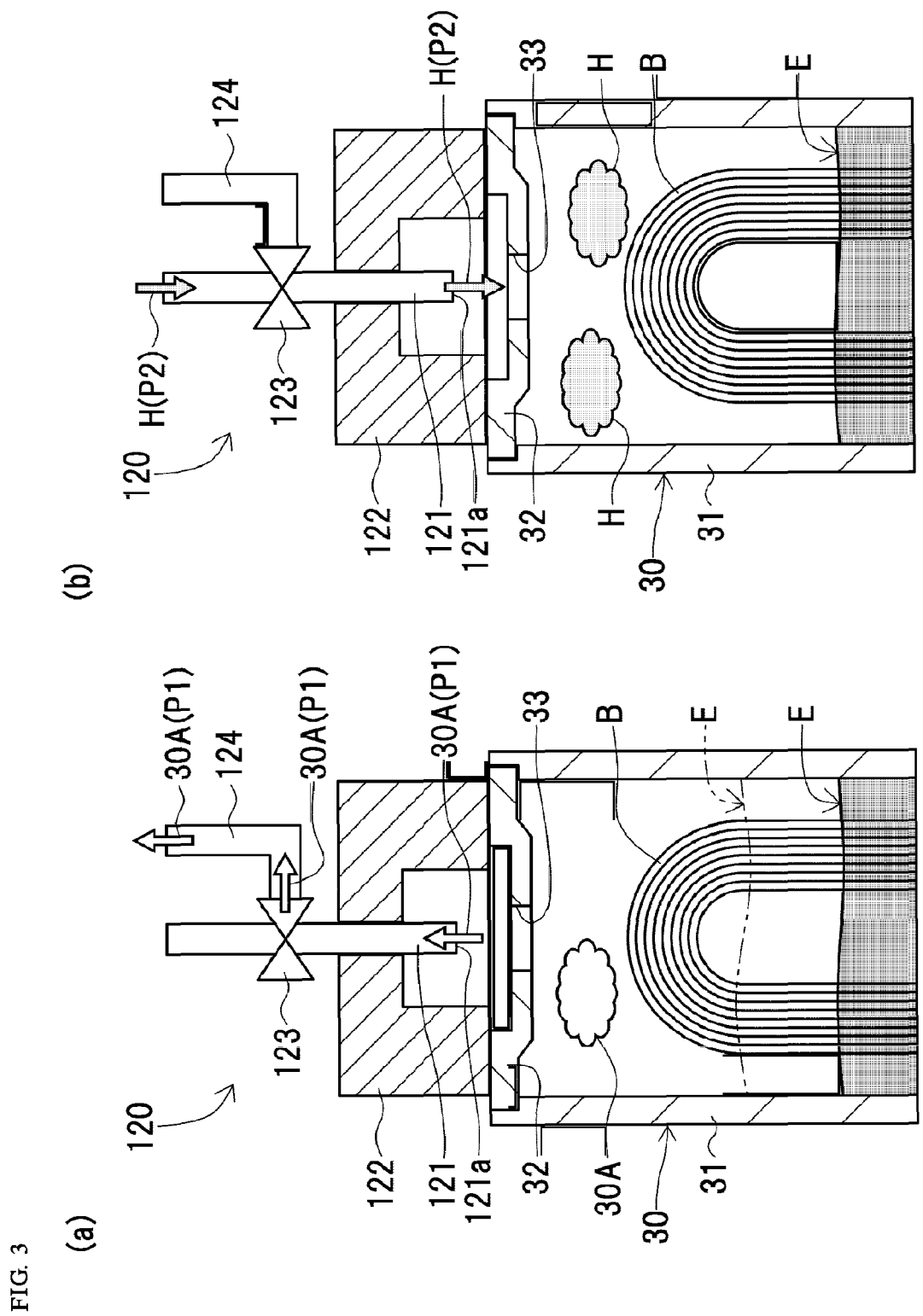
FIG. 3(a) shows how to reduce the internal pressure of an exterior.
FIG. 3(b) shows how to introduce detection gas.

At this time, the helium gas H is introduced by using an introducing device 120 shown in FIGS. 3(a) and 3(b).

For convenience, in FIGS. 3(a) and 3(b), the level of the electrolytic solution E is drawn at a position higher than that shown in FIG. 2.

As shown in FIGS. 3(a) and 3(b), the introducing device 120 is provided with a sealing nozzle 121, a sealing member 122, and a valve 123.

The sealing nozzle 121 is disposed above the pouring hole 33, and has a jetting port 121a at the lower end thereof. The valve 123 is connected at the middle part of the sealing nozzle 121 in the vertical direction.

As shown in FIG. 3(a), the sealing nozzle 121 is connected to a predetermined decompressing pump via the valve 123, a pipeline 124, and the like. In other words, in the introducing device 120, a decompressing path P1 is formed as a path extending from the sealing nozzle 121 toward the decompressing pump.

As shown in FIG. 3(b), the sealing nozzle 121 is connected to a predetermined helium gas supply source via the valve 123 and the like. In other words, in the introducing device 120, a supply path P2 is formed as a path extending from the helium gas supply source toward the sealing nozzle 121.

As shown in FIGS. 3(a) and 3(b), the sealing member 122 is formed in such a manner as to have a through hole penetrating in a vertical direction, the through hole being formed at the bottom (i.e., the upper surface) of a bottomed cylindrical member. That is to say, the sealing member 122 is formed in such a manner as to have the inner diameter of the lower portion (the lower portion in FIGS. 3(a) and 3(b)) greater than that of the upper portion (the upper portion in FIGS. 3(a) and 3(b)).

The sealing nozzle 121 is inserted into the upper portion of the sealing member 122. Moreover, the lower portion of the sealing member 122 projects downward of the jetting port 121a of the sealing nozzle 121. The projecting end abuts against the surroundings of the pouring hole 33 of the lid part 32. Consequently, the sealing member 122 seals the pouring hole 33 and the sealing nozzle 121.

In other words, the introducing device 120 is configured such that the helium gas H can be jetted inside of the exterior 30 and air 30A in the exterior 30 can be exhausted in the state in which the pouring hole 33 is sealed.

The above-mentioned introducing device 120 is provided with a pressure gauge capable of measuring the pressure inside the exterior 30.

The valve 123 closes either one of the decompressing path P1 and the supply path P2, and further, opens the other one. Specifically, the introducing device 120 switches the path communicating with the sealing nozzle 121 to either one of the decompressing path P1 and the supply path P2 under the control of the valve 123.

In the manufacturing step S1, when the helium gas H is introduced, first, the decompressing path P1 is opened (i.e., the decompressing path P1 and the sealing nozzle 121 are allowed to communicate with each other), and then, the decompressing pump is operated, thereby exhausting the air 30A in the exterior 30, as shown in FIG. 3(a).

At this time, the pressure gauge checks the pressure inside the exterior 30, thus reducing the internal pressure of the exterior 30 down to a predetermined pressure.

As shown in FIG. 3(b), the supply path P2 is opened (i.e., the supply path P2 and the sealing nozzle 121 are allowed to communicate with each other), and then, the helium gas H is supplied to the sealing nozzle 121 from the helium gas supply source, thereby jetting the helium gas H through the sealing nozzle 121.

At this time, the pressure gauge checks the pressure inside the exterior 30, thus returning the pressure inside the exterior 30 to the atmospheric pressure.

Specifically, in the manufacturing step S1, the helium gas H is introduced into the exterior 30 by the quantity of the reduction of the pressure inside the exterior 30, namely, the exhausted quantity of the air 30A in the exterior 30.

Here, the predetermined pressure (i.e., the pressure inside the exterior 30 during the decompression) is set to a pressure higher than the saturated steam pressure of the electrolytic solution E.

In this manner, the helium gas H can be introduced into the exterior 30 with the electrolytic solution E being not boiled.

Incidentally, in the present embodiment, the predetermined pressure is set to a value higher than and close to the saturated steam pressure of the electrolytic solution E.

Consequently, the helium gas H can be much more introduced into the exterior 30, so that the density of the helium gas H in the exterior 30 can be increased.

After the helium gas H is introduced into the exterior 30, the pouring hole 33 is sealed with the cap 40, as shown in FIG. 2 (see a solid triangle shown in FIG. 2).

At this time, the cap 40 is inserted into the upper portion of the pouring hole 33 in such a manner as to block the lower portion of the pouring hole 33. Thereafter, the outer edge of the cap 40 is irradiated with a laser by a laser welder, so that the pouring hole 33 is sealed.

After the pouring hole 33 is sealed, the leakage from the exterior 30 (i.e., the sealability of the exterior 30) is checked.

At this time, the exterior 30 is housed in a predetermined chamber 131, and the inside of the chamber 131 is evacuated. Then, a commercially available helium gas leakage inspector determines whether or not the helium gas H leaks from the exterior 30 to the inside of the chamber 131.

Figure 4:
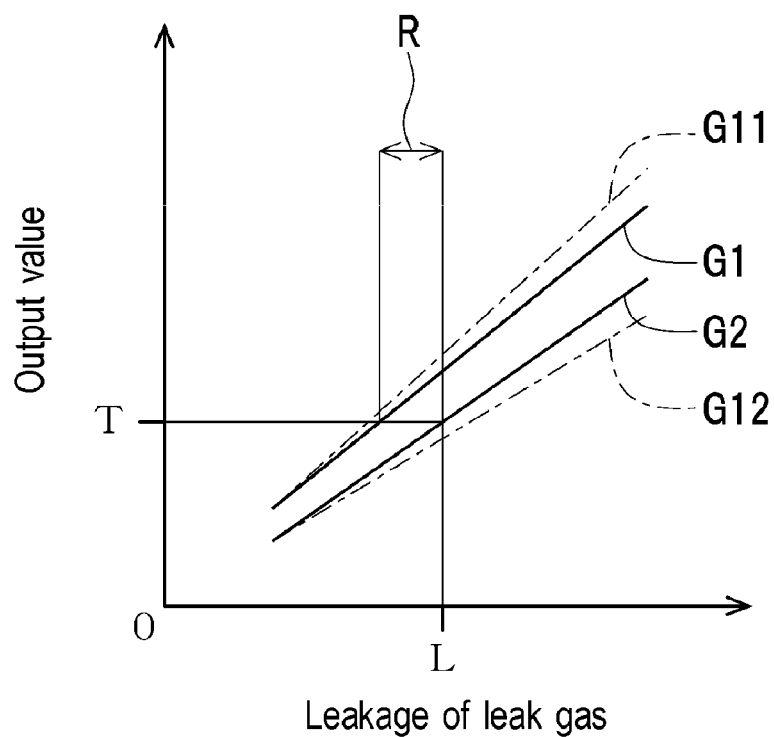
FIG. 4 is a graph illustrating a range of erroneous determination.

Specifically, as shown in FIG. 4, the helium gas leakage inspector detects the quantity of the helium gas H present in gas leaking from the exterior 30 to the inside of the chamber 131 in the manufacturing step S1, and then, when an output value of the helium gas leakage inspector exceeds a predetermined inspection threshold T, it is determined that the gas leaks from the exterior 30.

In this manner, a leak testing step for detecting the leakage of the helium gas H serving as detection gas introduced into the exterior 30 is performed in the manufacturing step S1.

After the leakage from the exterior 30 is checked, the battery 10 is initially charged, a voltage is inspected, and the like, as shown in FIG. 2.

The sealed battery 10 is manufactured in the above-mentioned manner in the manufacturing step S1.

Here, the electrolytic solution E poured into the exterior 30 penetrates the electrode body B. Along with this, the level of the electrolytic solution E in the exterior 30 is gradually lowered, so that the gas present inside the electrode body B is exhausted to the outside of the electrode body B.

The penetrance of the electrolytic solution E with respect to the electrode body B, namely, the quantity of the exhausted gas varies depending on variations in time after the pour of the electrolytic solution E until the leak testing step (see the electrolytic solution E shown in FIG. 3(a)).

Consequently, in the case where the helium gas H is introduced when the electrolytic solution E is poured, the quantity of the exhausted gas is influenced by the variations in penetrance of the electrolytic solution E with respect to the electrode body B. Therefore, the density of the helium gas present in the leak gas (i.e., the density of the helium gas H in the exterior 30 in the leak testing step) unfavorably varies.

Figure 6:
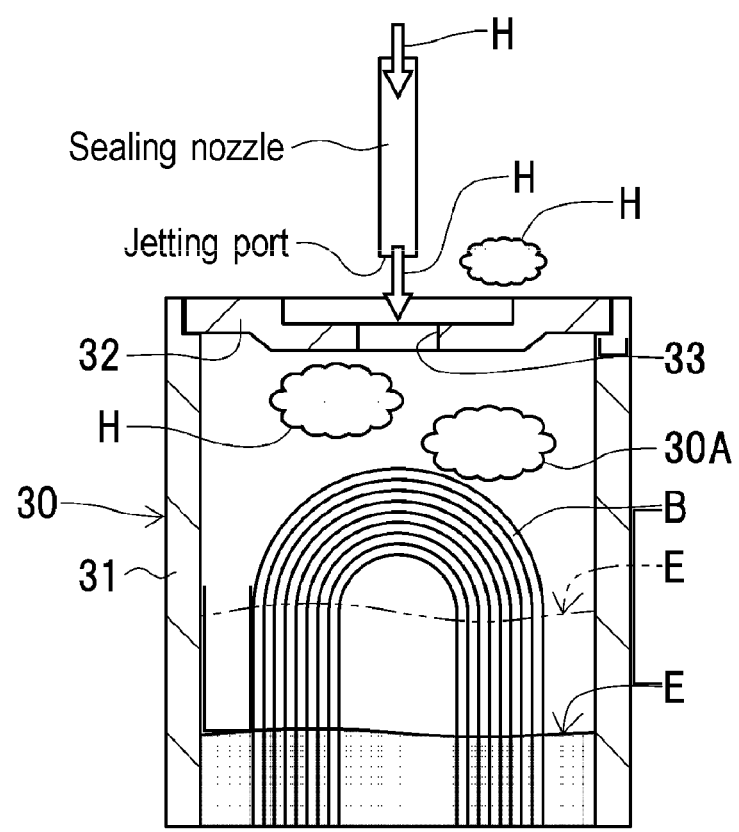
FIG. 6 shows how to introduce the detection gas without reducing the internal pressure of the exterior.

As shown in FIG. 6, in the case where a predetermined quantity of the helium gas H is introduced into the exterior 30 after the electrolytic solution E is poured, the size of a space inside the exterior 30 unfavorably varies depending on the level of the electrolytic solution E at the time of the introduction of the helium gas H, and accordingly, the density of the helium gas in the exterior 30 unfavorably varies.

In other words, in this case, the density of the helium gas inside the exterior 30 cannot become constant due to the influence of the variations in penetrance of the electrolytic solution E with respect to the electrode body B, and therefore, the density of the helium gas present in the leaking gas unfavorably varies.

In view of this, in the manufacturing step S1, the inside of the exterior 30 is once decompressed after the electrolytic solution E is poured, as shown in FIG. 3(a).

More specifically, in the manufacturing step S1, the electrolytic solution E poured into the exterior 30 penetrates the electrode body B to some extent (e.g., to such an extent that there is no influence on the leak testing step even if the gas present inside the electrode body B after the introduction of the helium gas H is further exhausted), and then, the inside of the exterior 30 is once decompressed.

In this manner, in the manufacturing step S1, the air 30A is exhausted from the exterior 30 by the quantity according to the level of the electrolytic solution E.

Specifically, in the manufacturing step S1, the air 30A is more exhausted from the exterior 30 in the case of the low level of the electrolytic solution E: in contrast, the air 30A is less exhausted from the exterior 30 in the case of the high level of the electrolytic solution E.

In the manufacturing step S1, as shown in FIG. 3(b), the pressure inside the exterior 30 is returned to the atmospheric pressure by using the helium gas H, so that the helium gas H is introduced into the exterior 30 by the quantity in accordance with the level of the electrolytic solution E.

Specifically, in the manufacturing step S1, the helium gas H is more introduced in the case of the low level of the electrolytic solution E: in contrast, the helium gas H is not more introduced in the case of the high level of the electrolytic solution E.

In this manner, in the manufacturing step S1, the density of the helium gas in the exterior 30 can be made a density corresponding to a change in pressure inside the exterior 30 at the time of the introduction of the helium gas H irrespective of the penetrance of the electrolytic solution E with respect to the electrode body B at the time of the introduction of the helium gas H.

In the case where the pressure is returned to the atmospheric pressure after the decompression, as in the present embodiment, the density of the helium gas in the exterior 30 can become a density corresponding to a pressure at the decompression.

Therefore, in the manufacturing step S1, the check of the change in pressure inside the exterior 30 at the time of the introduction of the helium gas H ensures that the density of the helium gas in the exterior 30 becomes the density corresponding to the change in pressure inside the exterior 30 at the time of introduction of the helium gas H, namely, the constant density.

Furthermore, in the manufacturing step S1, the density of the helium gas in the exterior 30 can be made constant irrespective of the penetrance of the electrolytic solution E with respect to the electrode body B at the time of the introduction of the helium gas H, thus reducing the variations in density of the helium gas present in the leaking gas.

As a consequence, as shown in FIG. 4, a difference between an output value of the helium gas leakage inspector in the case of the high density of the helium gas present in the leaking gas when the quantity of the gas leaking from the exterior 30 takes a predetermined value (a straight line G1 illustrated in FIG. 4) and an output value of the helium gas leakage inspector in the case of the low density of the leaking gas (a straight line G2 illustrated in FIG. 4) can be made small in the manufacturing step S1.

In other words, it is possible to reduce the variations in the output value of the helium gas leakage inspector depending on the density of the helium gas present in the leaking gas in the manufacturing step S1.

Figure 7:
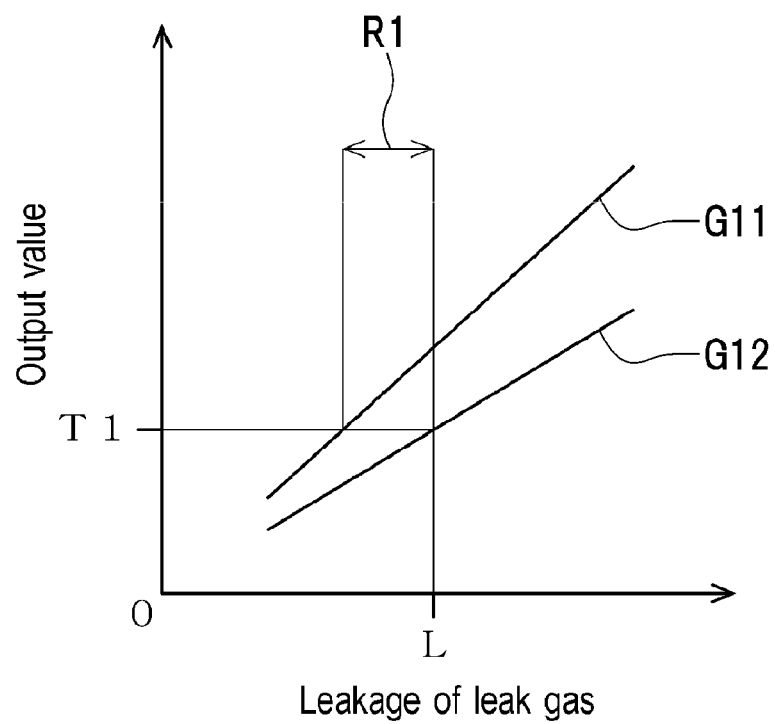
FIG. 7 is a graph illustrating a range of erroneous determination in the related art.

Incidentally, alternate long and short dashed lines G11 and G12 in FIG. 4 correspond to straight lines G11 and G12 in FIG. 7, respectively.

Therefore, the inspection threshold T can be increased by the quantity of the reduction of the variations in the output value of the helium gas leakage inspector in the manufacturing step S1.

Consequently, it is possible to suppress a possibility that good products are erroneously determined as deficient products since the output value of the helium gas leakage inspector exceeds the inspection threshold T in the case of the high density of the helium gas present in the leaking gas, irrespective of the smaller leakage quantity of the leaking gas than a leakage quantity L of the leaking gas corresponding to the inspection threshold T in the case of the low density of the helium gas present in the leaking gas (see a range R illustrated in FIG. 4).

In this manner, the manufacturing step S1 can reduce an erroneous determination rate in the leak testing step. Moreover, it is possible to enhance robustness in the leak testing step.

Here, a part of the electrolytic solution E to be poured into the exterior 30 evaporates before the leak testing step. In other words, evaporating components of the electrolytic solution E (e.g., hydrocarbon or the like) are present inside the exterior 30 having the electrolytic solution E poured thereinto. The specific gravity of the evaporating components of the electrolytic solution E is heavier than that of the helium gas H.

Therefore, in the case where the helium gas H is simply jetted from the sealing nozzle after the pour of the electrolytic solution E, as shown in FIG. 6, the evaporating components of the electrolytic solution E having the heavy specific gravity unfavorably suppress the introduction of the helium gas H into the exterior 30.

Additionally, in the case where the helium gas H is simply jetted through the sealing nozzle, the helium gas H having the light specific gravity is hardly sunk inside the exterior 30, and therefore, a large quantity of the helium gas H is present in the vicinity of the pouring hole 33. Consequently, in this case, the helium gas H greatly leaks before the pouring hole 33 is sealed.

In other words, in the case where the helium gas H is simply jetted from the sealing nozzle, the helium gas H cannot be introduced into the exterior 30 without any waste because of the influence of the evaporating components of the electrolytic solution E.

In contrast, the inside of the exterior 30 is once decompressed, and then, the helium gas H is introduced in the manufacturing step S1, as shown in FIGS. 3(a) and 3(b).

Specifically, in the manufacturing step S1, the evaporating components of the electrolytic solution E are exhausted to some extent, and then, the helium gas H is jetted. Therefore, it is possible to introduce a large quantity of the helium gas H into the exterior 30, and further, allow the helium gas H to be sunk inside the exterior 30.

As a consequence, in the manufacturing step S1, the helium gas H can be introduced at a high density, and further, the leakage quantity of the helium gas H can be reduced before the pouring hole 33 is sealed.

Thus, the leak testing step can be performed at the high density of the helium gas in the exterior 30, namely, at the high density of the helium gas present in the leaking gas. Therefore, the leak testing step can be performed with high accuracy.

Since the helium gas H is jetted from the sealing nozzle 121 in the state in which the pouring hole 33 is sealed by the sealing member 122 in the manufacturing step S1, the substantially total quantity of the jetted helium gas H can be introduced into the exterior 30. That is to say, the introducing device 120 shown in FIGS. 3(a) and 3(b) introduces the helium gas H, thus introducing the helium gas H without any waste.

As a consequence, the manufacturing step S1 can reduce a cost required for the leak testing step.

As described above, in the manufacturing step S1, after the electrolytic solution E is poured into the exterior 30, the internal pressure of the exterior 30 is reduced down to the predetermined pressure, and then, the helium gas H is introduced into the exterior 30 in the quantity corresponding to the predetermined pressure.

Incidentally, in the manufacturing step S1, the helium gas H is introduced into the exterior 30, so that the pressure inside the exterior 30 is returned to the atmospheric pressure. However, the present invention is not limited to this.

For example, the helium gas H is introduced into the exterior 30, and then, the inside of the exterior 30 may be pressurized to approximately several kPa or the inside of the exterior 30 may be decompressed to approximately several kPa.

In other words, the quantity corresponding to the predetermined pressure need not always be equal to the quantity of the air 30A exhausted from the exterior 30 at the time of the decompression down to the predetermined pressure.

Specifically, the quantity corresponding to the predetermined pressure may be greater than the quantity of the exhausted air 30A or smaller than the quantity of the exhausted air 30A.

If the helium gas H is introduced into the exterior 30 in the quantity greater than the quantity of the exhausted air 30A, the helium gas can be introduced at a higher density in comparison with the case where the helium gas H is introduced into the exterior 30 in the quantity equal to the quantity of the exhausted air 30A. Therefore, the leak testing step can be performed with high accuracy.

In contrast, if the helium gas H is introduced into the exterior 30 in the quantity smaller than the quantity of the exhausted air 30A, the quantity of the helium gas H to be introduced can be reduced in comparison with the case where the helium gas H is introduced into the exterior 30 in the quantity equal to the quantity of the exhausted air 30A. Therefore, a cost required for the leak testing step can be reduced.

The measurement result of the density of the helium gas in the case of introducing the helium gas H in the manufacturing step S1 is described below.

In measuring the density of the helium gas, the inside of the exterior 30 was once decompressed, the helium gas H was introduced into the exterior 30, thereby returning the inside of the exterior 30 to the atmospheric pressure, and thereafter, the pouring hole 33 was sealed. This series of operations was repeated, and thus, a plurality of test pieces were fabricated. In other words, the manufacturing step S1 was repeated a plurality of times, so that a plurality of test pieces were fabricated (see FIGS. 3(a) and 3(b)

Moreover, in measuring the density of the helium gas, the helium gas H was introduced into the exterior 30 without reducing the internal pressure of the exterior 30, and thereafter, the pouring hole 33 was sealed. This series of operations was repeated, and thus, a plurality of test pieces were fabricated in a comparative example (see FIG. 6).

In measuring the density of the helium gas, the exterior 30 was bored with respect to each of the test pieces after the introduction of the helium gas H, and then, the head of a helium density measuring device was speedily pressed against the bore, thereby measuring the density of the helium gas.

Figure 5:
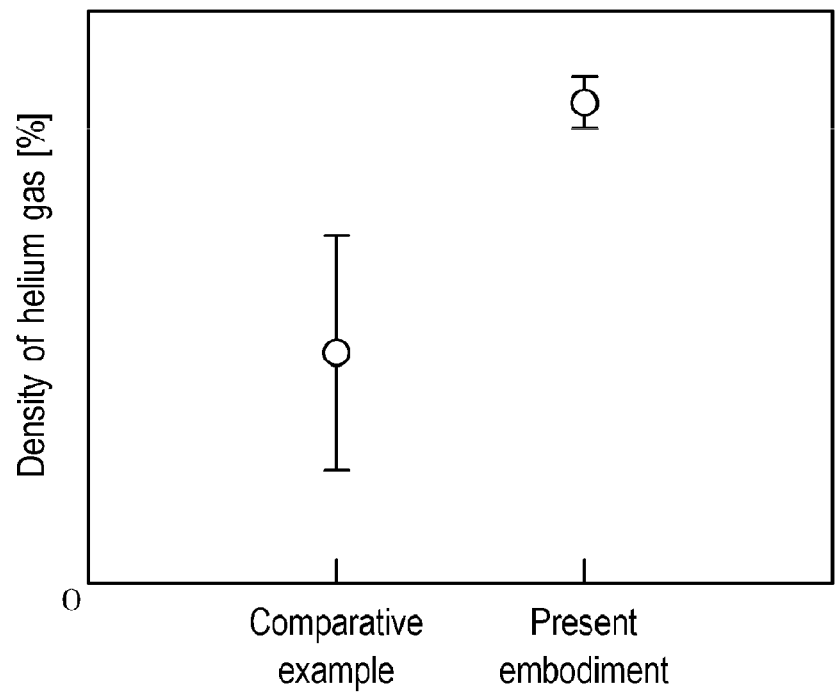
FIG. 5 is a chart illustrating measurement results of a density of helium gas.

As shown in FIG. 5, the density of the helium gas in the test piece fabricated through the manufacturing step S1 became higher than that in the test piece in the comparative example.

Furthermore, variations in density of the helium gas in the test piece fabricated through the manufacturing step S1 became smaller than those in the test piece in the comparative example.

From the above-mentioned measurement result, it was revealed that the manufacturing step S1 could introduce the helium gas H into the exterior 30 at the high density, and further, that it could reduce the variations in density of the helium gas present in the leaking gas.

Consequently, in the manufacturing step S1, it was revealed that the leak testing step could be performed with high accuracy, and further, that an erroneous determination rate in the leak testing step could be reduced.

In measuring the density of the helium gas, the density of the helium gas in the test piece immediately after the introduction of the helium gas H also was measured in the manufacturing step S1. At this time, the density of the helium gas corresponds to a change in pressure inside the exterior 30 at the time of the introduction of the helium gas H.

In other words, it was revealed that the density of the helium gas inside the exterior 30 corresponds to a change in pressure inside the exterior 30 at the time of the introduction of the helium gas H, irrespective of the penetrance of the electrolytic solution E to the electrode body B at the time of the introduction of the helium gas H in the manufacturing step S1.

Incidentally, although various kinds of gas can be used as the detection gas, it is preferable that the helium gas is adopted. This is because the adoption of the helium gas can prevent any influence on battery performance, the molecular diameter is so small that leakage from a fine hole can be detected, and the like, thus producing various effects in comparison with other gas.

Additionally, a mixture gas of the helium gas and gas other than the helium gas may be introduced at the time of the introduction of the helium gas.

INDUSTRIAL APPLICABILITY

The present invention is applicable to a method for manufacturing a sealed battery, including a leak testing step for detecting leak of detection gas introduced into a battery case.

REFERENCE SIGNS LIST

10: battery (sealed battery)
30: exterior (battery case)
H: helium gas (detection gas)

The invention claimed is:

1. A method for manufacturing a sealed battery, including a leak testing step for detecting leak of detection gas introduced into a battery case, the method comprising:
    pouring an electrolytic solution into the battery case through a pouring hole of the battery case;
    after pouring the electrolytic solution through the pouring hole, reducing an internal pressure of the battery case to a predetermined pressure when a pressure gauge checks the internal pressure inside the battery case and the pouring hole is arranged to face an upper direction; and
    introducing the detection gas in a quantity corresponding to the predetermined pressure when the pressure gauge checks the pressure inside the battery case and the pouring hole is arranged to face the upper direction.

2. The sealed battery manufacturing method according to claim 1, wherein
    the predetermined pressure is higher than a saturated steam pressure of the electrolytic solution.

* * * * *